W. W. Groom,
Cotton Planter
No. 110,832. Patented Jan. 10, 1871.

Witnesses:
Chas. Nida
Alex F. Roberts

Inventor:
W. W. Groom
per Munn & Co.
Attorneys.

United States Patent Office.

WILLIAM W. CROOM, OF MONTGOMERY, ALABAMA.

Letters Patent No. 110,832, dated January 10, 1871.

---

IMPROVEMENT IN COTTON-SEED PLANTERS AND GUANO-DISTRIBUTERS.

---

The Schedule referred to in these Letters Patent and making part of the same.

---

*To all whom it may concern:*

Be it known that I, WILLIAM W. CROOM, of Montgomery, in the county of Montgomery and State of Alabama, have invented a new and useful Improvement in Cotton-Seed Planter and Guano-Distributer; and I do hereby declare that the following is a full, clear, and exact description thereof, which will enable others skilled in the art to make and use the same, reference being had to the accompanying drawing forming part of this specification.

Similar letters of reference indicate corresponding parts.

My invention has for its object to furnish an improved machine for planting cotton-seed and distributing guano, either or both, and which shall be simple in construction, and effective and reliable in operation; and It consists in the construction and combination of the various parts of the machine, as hereinafter more fully described.

A is the frame-work of the machine, in bearings in which the axle-tree B revolves.

The ends of the axle-tree B are squared off to fit into the square holes in the hubs of the wheels C, so that the said wheels may carry the said axle-tree with them in their revolution.

D are the seed-boxes, which are made in the form of square truncated pyramids, and which are placed base to base, and about one inch apart, upon the square middle part of the axle-tree B.

Figure 1:
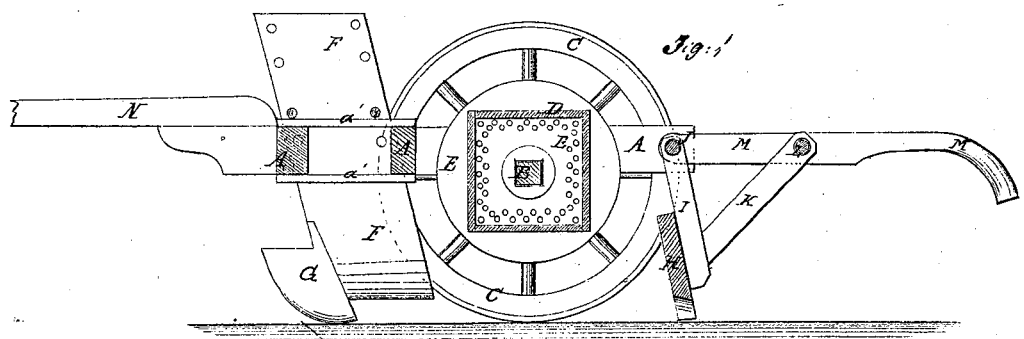
Figure 1 is a vertical longitudinal section of my improved machine, taken through the line x x, fig. 2.

To the loose, larger, or inner ends of the seed-boxes D, are secured circular disks E, of sheet metal, having holes formed through them around the edges of the sides of the said boxes D, as shown in fig. 1.

In one side of the seed-boxes D, are formed openings for the introduction of the seed or guano, which openings are closed by sliding or other doors, d'.

By this construction, as the machine is drawn forward, the seed is carried up by the corners or angles of the seed-boxes D, and allowed to fall against the plates E, through the holes in which they pass out into the space between the two seed-boxes, D, through which space they drop into the furrow.

The amount of seed or guano distributed is regulated by closing more or fewer of the holes through the disks E, with corks or other similar means.

Figure 2:
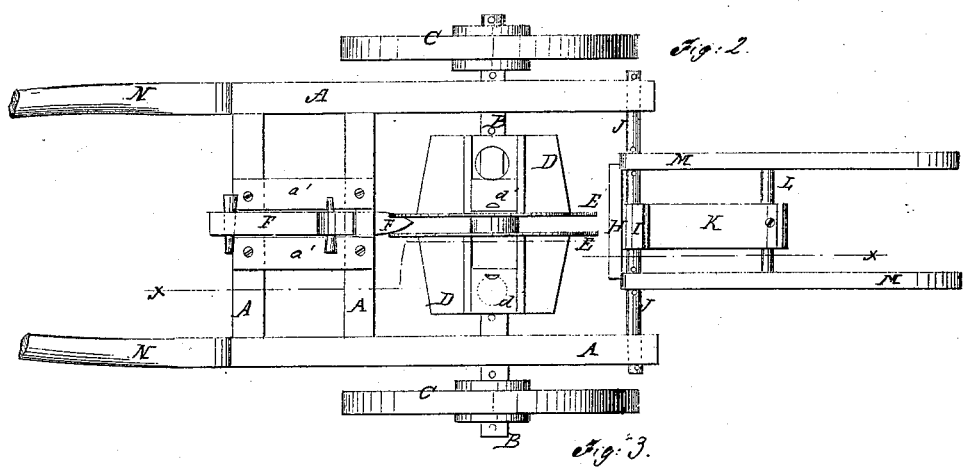
Figure 2 is a top view of the same.
Figure 3:
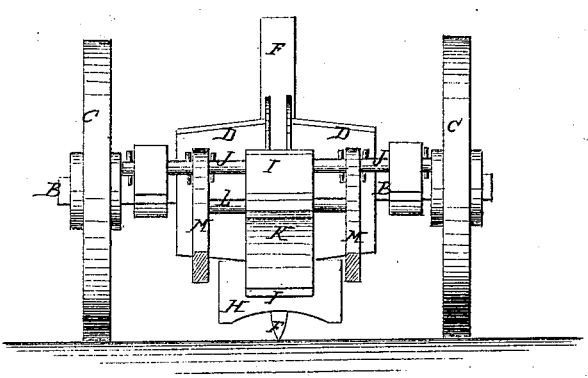
Figure 3 is a rear view of the same, part of the handles being broken away.

Or, another set or sets of plates, E, may be provided, made with larger holes, for use when a larger amount of seed is desired to be distributed to the acre.

a' are two short parallel bars, attached to the front cross-bars of the frame A at such a distance apart as to receive the cutter-standard F between them, and in such positions that the said cutter-standard may be directly in front of the space between the two seed-boxes D, as shown in figs. 2 and 3.

The standard F is made long and wide, and of such a thickness as to form a furrow of the desired width.

The lower edge of the standard F is made wedge-shaped, as shown in figs. 2 and 3, to give the desired form to the furrow, and leave its sides smooth.

The lower part of the forward edge of the said standard F is beveled off, as shown in fig. 1, to form a seat for the cutter G.

The cutter G is made in about the shape shown in fig. 1, and is securely attached to the lower part of the forward edge of the standard F.

The standard F is supported and kept from dropping down too far by pins passing through holes in the said standard, and which rest upon the bars a'.

By this construction of the standard and cutter, should the cutter strike a root or other obstruction, they will rise, pass over it, and drop again to their place.

H is the coverer, the lower edge of which is hollowed or concaved, to give the desired form to the row or ridge.

The coverer H is attached to the lower part of the bar or block I, through a hole, in the upper end of which the rod J passes, so as to pivot the said bar or block to the frame A.

The block I is held in place and supported by the bar or block K, the lower end of which is securely attached to the lower part of the bar or block I, and through a hole in the upper end of which the rod L passes.

The ends of the rod L are secured to the middle parts of the handles M; and also serve as a round to hold the said handles in their proper relative positions.

The rod or shaft J passes through holes in the forward ends of the handles M, so as to pivot the said handles to the said rod.

By this construction the coverer and handles are rigidly connected with each other, and both are pivoted to the frame A by the rod or shaft J.

The coverer is thus held down to the ground by the weght of the blocks and handles with which said coverer is connected, and when additional weight may be required, it may be obtained by bearing down upon the handles.

When not in use, the handles and coverer may be turned up on the rear part of the machine, so as to be out of the way.

N represents the thills or tongue, which are attached to the forward part of the frame A.

Having thus described my invention,

I claim as new and desire to secure by Letters Patent—

1. The two pyramidal seed-boxes D, having perforated plates E attached to their adjacent ends, and being rigidly attached to the square axle or shaft B, said parts D E being constructed and operating in connection with the axle B and wheels C, substantially as herein shown and described, and for the purpose set forth.

2. A furrow-opener standard F, supported loosely by pins upon and between the bars $a'$, for the purpose of allowing it to easily slip up and over a root or other obstacle in its path, as described.

The above specification of my invention signed by me this 21st day of September, 1870.

WILLIAM W. CROOM.

Witnesses:
JAMES T. GRAHAM,
T. B. MOSHER.